Figure 9:
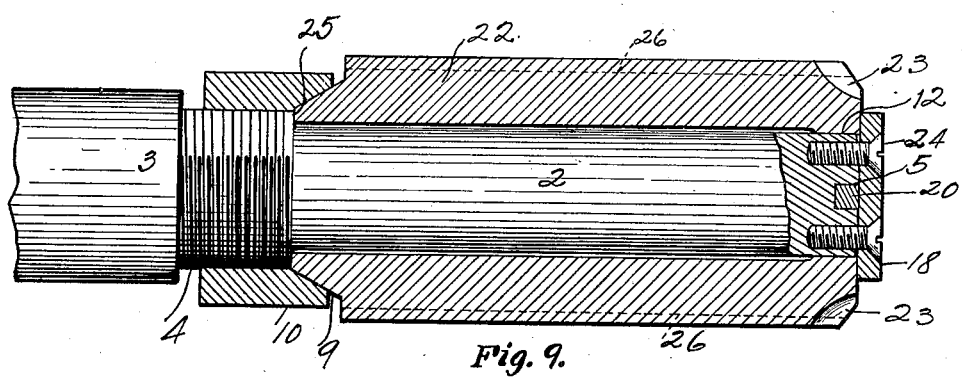

J. GALLAGHER.
REAMER.
APPLICATION FILED APR. 20, 1908.
914,653.
Patented Mar. 9, 1909.
2 SHEETS—SHEET 1.
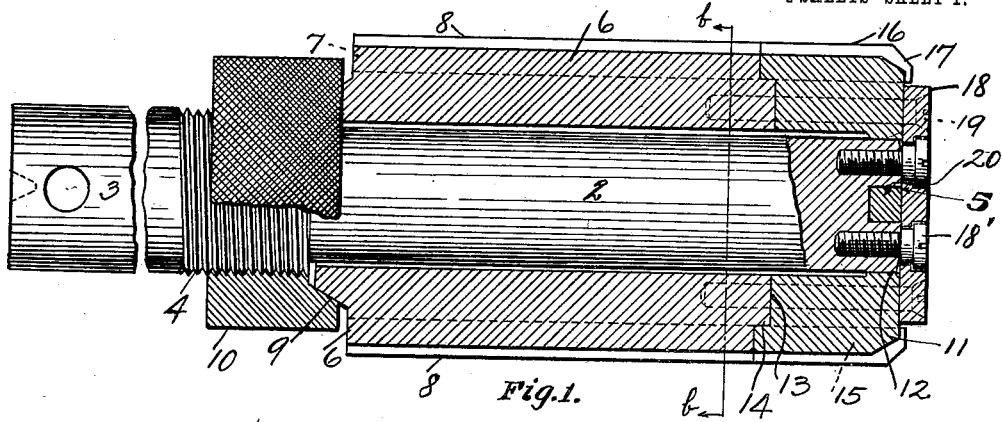
Fig. 1.
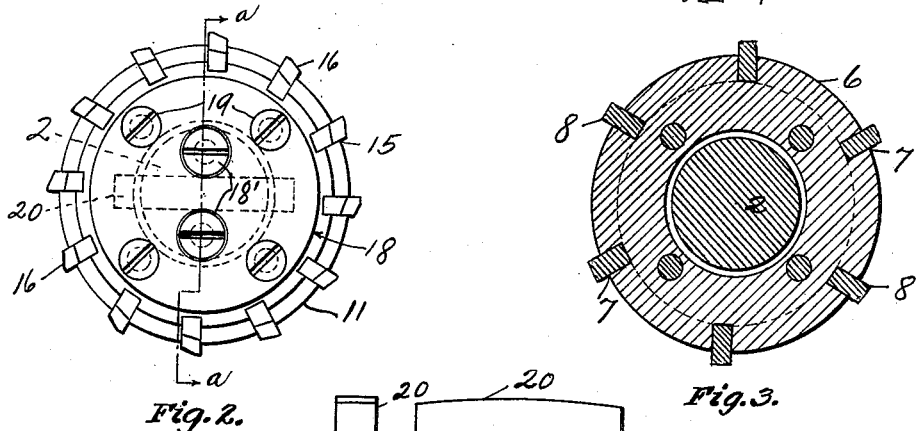
Fig. 2.   Fig. 6.   Fig. 3.
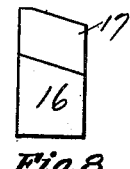
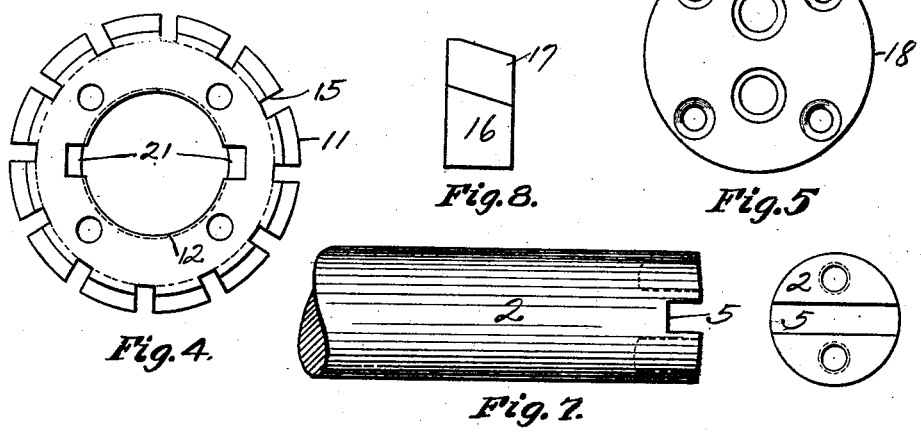
Fig. 4.   Fig. 8.   Fig. 5.
Fig. 7.
WITNESSES:
A. W. Heape
R. L. Wallace
INVENTOR.
John Gallagher.
By Harry De Wallace
ATTORNEY.

J. GALLAGHER.
REAMER.
APPLICATION FILED APR. 20, 1908.

914,653.

Patented Mar. 9, 1909.
2 SHEETS—SHEET 2.

WITNESSES:
A. W. Heape
R. L. Wallace.

INVENTOR.
John Gallagher.
By Harry De Wallace
ATTORNEY.

UNITED STATES PATENT OFFICE.

JOHN GALLAGHER, OF WATERTOWN, NEW YORK.

REAMER.

No. 914,653.    Specification of Letters Patent.    Patented March 9, 1909.

Application filed April 20, 1908.    Serial No. 428,025.

*To all whom it may concern:*

Be it known that I, JOHN GALLAGHER, a citizen of the United States, residing at Watertown, in the county of Jefferson and State of New York, have invented certain new and useful Improvements in Reamers, of which the following is a specification.

This invention relates to improvements in reamers designed for use in connection with lathes, boring machines and the like, and the invention relates particularly to a reamer of the class commonly known as "floating rose" reamers.

The object of the invention is to provide a reamer of the class, which is simple, strong and effective, and wherein the construction and arrangement of the parts are such that a hole may be reamed true to the axis of the machine, whether the machine is in perfect adjustment or "off centers".

A further object is to provide a reamer by means of which all of the cutting is preferably done at or near the free end thereof.

A further object is to provide a reamer in which the cutting parts are driven by means of the operating power being applied directly to the initial cutting extremity of the device. And a further object is to provide a reamer of inexpensive construction, and which will stand considerable wear and abuse without requiring repairing or renewing.

The invention pricipally consists of a spindle or shank adapted for use in connection with a lathe or boring machine, upon which is concentrically mounted a cylindrical part or follower having an internal bore greater than the diameter of the spindle throughout its length, and having its circumferential surface provided with longitudinal slots or grooves to receive a series or radial blades.

The invention further consists of a cutter-head which is mounted upon the free end of the spindle and rigidly connected to said cylindrical part, the said cutter-head having grooves in its external surface to receive tight-fitting cutting-blades, the latter disposed radially, and alternately matching said radial blades; a portion of the central bore of the cutter-head having the same diameter as the spindle, the other portion counter-bored to correspond to the bore of the follower.

The invention further consists of simple means for yieldingly connecting the cutter-head to the free bed of the spindle.

The invention further consists of a key or part operably disposed in a key-way or slot formed diametrically in the free end of the spindle, in line with coinciding notches formed in the cutter-head, by means of which the floating cutting parts of the reamer are driven. And the invention further consists of an adjustable mechanism for holding said cylinder truly concentric with the spindle, when desired, or for allowing the rear end of the same either to float to, or assume a position eccentric to the axis of the spindle, for the purpose of guiding or steering the cutter-head in line with the true axis of the machine.

To this end the invention consists in the combination, construction and arrangement of the parts of the reamer, as hereinafter fully described, illustrated by the accompanying drawings, and then pointed out in the claims.

Figure 10:
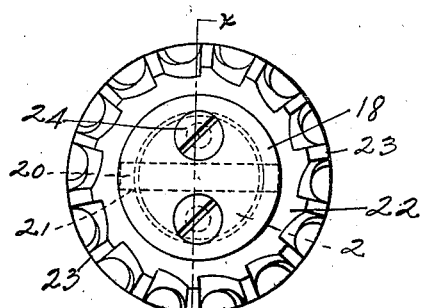
Figure 11:
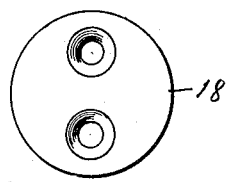
Figure 12:
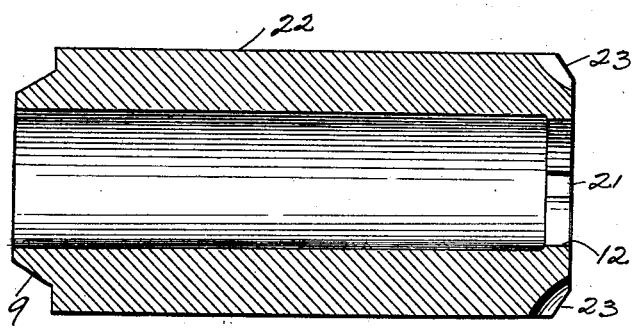

Referring to the drawings, Figure 1 is a central longitudinal section substantially on the line $a-a$ of Fig. 2, showing the construction and arrangement of the principal parts of the invention. Fig. 2 is a front end view, showing the form and location of the cutter-blades; also showing, by full lines, the cap which connects the cutter-head to the end of the shank or spindle, and showing by dotted lines, the location of the key which drives the cutter-head and follower. Fig. 3 is a cross section, substantially on the line $b-b$ of Fig. 1, showing the cylindrical follower and the number and location of the follower blades. Fig. 4 is a front end view of the cutter-head with blades removed, showing slots or sockets to receive the ends of driving key. Fig. 5 is a plan view of the circular cap which connects cutter-head to spindle. Fig. 6 is a side and end view of the driving-key, showing outer face curved to allow the cap a slight rolling movement. Fig. 7 is a partial side elevation and end view of the spindle, showing slot for driving-key. Fig. 8 is an enlarged end view of one of the cutter-blades. Fig. 9 is a longitudinal section substantially on the line $x-x$ of Fig. 10, showing a modified construction of reamer. Fig. 10 is a front end view of the reamer shown in Fig. 9. Fig. 11 is a front face view of the cap. Fig. 12 is a central longitudinal section of the follower, showing the location of the notch which receives one end of the driving-key.

Similar characters of reference are assigned to corresponding parts throughout the several views.

In the drawings, 2 represents a spindle or shank preferably made of steel, having a handle 3, adapting it to be applied either to a chuck, or between the lathe centers, and having a threaded portion 4 formed near its middle. The inner end of the shank is provided with a dimetrical slot or groove 5, the use of which will be explained below.

6 represents a cylindrical follower or shell bored out centrally to loosely fit over the spindle, and which is preferably made of cast-iron or other suitable metal. The follower 6 is preferably provided around its outer surface with a series of equally spaced, longitudinal slots 7, adapted to receive a number of cutting-blades 8. The blades 8 are preferably made of hard steel to a thickness suitable for driving them tightly into the grooves or slots 7. These blades should be formed to a width greater than the depth of slots 7, so that when applied to the follower the outer edges will project beyond the surface of the cylinder 6, and they should preferably extend the full length of the follower, as shown. I prefer to employ but six of the radial blades 8, that being a sufficient number to truly center the follower in any hole to be reamed. A greater or fewer number of the blades 8, however, may be employed with good results. The rear end of follower 6 is formed into an annular cone-shaped projection 9, which is intended to receive the inner end of a gland-nut 10 adjustably mounted on the threaded portion 4, and by means of which the rear end of the follower may be adjusted and held in different positions relative to the spindle 2. The particular object of these parts being to permit the operator to tighten or loosen the gland-nut, so as to either hold the rear end of the follower rigidly and truly concentric with the spindle, or by relaxing the tension of the nut, to permit the rear end of the follower to vibrate or float until the reamer adjusts itself to, or finds the true axis of the machine. This feature is particularly valuable when reaming is being done by machines which are "off centers".

11 represents a cutter-head, collar-like in form, having an outer and inner diameter corresponding to the like diameters of the follower 6, excepting for a short distance at the extreme outer end, where the bore of the head is intended to have substantially the same diameter as the outer end of spindle 2, as indicated at 12. The cutter-head 11 is preferably made of steel and provided on its inner face with a recess or counter-sunk portion 13 to receive and tightly fit a corresponding annular projection 14 formed on the front end of the follower.

15 represents a series of slots or grooves formed longitudinally at regular intervals in the circumferential surface of the head 11, into which are fitted, preferably by driving, a series of cutter-blades 16. These blades are preferably formed of the same material and have the same cross-section as the blades 8. The blades 16 have their outer corners beveled at 17, to facilitate entering the reamer into the hole.

Fig. 8 illustrates the preferred manner of forming the cutter-blades 16. The head 11, is fitted with double the number of cutting-blades as the follower, and they are preferably arranged so that alternate cutter-blades match one of the follower blades, thus making at least 6 blades which extend the combined length of the follower and head. I prefer to employ a greater number of blades in the head than in the follower for the reason that, generally speaking, in a "rose" reamer such as I have shown, all or nearly all of the cutting is done by the blades, or that portion of the blades which first enters a hole, the follower-blades therefore, having little work to do, for the most part, merely serve the purpose of guiding and holding the reamer truly concentric with the hole and in line with the axis of the machine. Since a rose reamer does all or nearly all of the cutting at its free end, the cutter-blades 16 are preferably made much shorter than the other blades, and as they have to be renewed oftener, it requires less stock for the renewal. Because the blades 16 are subjected to greater wear and use, they also require more frequent grinding, and being comparatively short are readily and quickly sharpened; while on the other hand, the blades 8 perform little work, and are subjected to but slight wear, only require occasional grinding, and being few in number this work consumes but little time. The blades 16 are preferably disposed in the head in such manner that the opposite ends project beyond the body of the head far enough to permit of their being readily detached. For reamers above two and one-half inches in diameter, I prefer to employ such numbers of the cutter-blades 16 as will represent exact multiples of the numbers of the follower blades 8. For instance, if six blades are employed on the followers, then the cutter-heads should be provided with 12, 18 and so on, according to the size of the reamer. Under this arrangement certain of the cutter-blades in regular order around the head will line up or correspond with the follower blades. Another reason for this arrangement of the blades is, that, the reamer may be readily converted from a "rose" to a "fluted" or "shell" reamer by simply backing off the cutters in the cutter-head and follower right to the cutting edge, which may be done in a few minutes time without distorting the tool. 18 represents a circular plate or cap having a less diameter than the inner circle described by the over-hanging ends of the cutter-blades, which is secured to the front end of stock 2, by means of a pair of shouldered screws 18', which pass loosely through perforations formed near the center of the cap. The inner shoulders of these screws are intended to bear tightly against the outer end of stock 2. Cap 18 is also connected to the outer face of the head 11, by means of a series of screws or bolts 19, which pass through the cap and through corresponding holes in the head, and their inner ends enter threaded holes formed in the front end of the follower. Under this method of connecting the cap, the head, and the follower, these parts are held rigidly together, while the connection between the cap and end of the shank with the screws 19 loosely inserted through the cap, the follower, head and cap are allowed a slight rolling or rocking movement upon the end of the spindle. The extreme outer end of the spindle is also slightly rounded or convexed as shown in Figs. 1 and 7 so as to permit the follower and head to have the said rolling or rocking movement. By reason of the follower and a portion of the head having a greater bore than the diameter of the spindle 2, the reamer may perfectly ream a hole when driven by a machine which is several degrees off center, and the external or floating shell of the reamer will readily accommodate itself to the direction the hole should take, or in other words, ream the hole true to the axis of the machine, whether or not the machine is truly centered. 20 represents a key, rectangular in form and made of suitable metal, like tool-steel, which is employed for driving the cutting parts of the reamer. When assembling the various parts of the reamer, this key is dropped into the slot 5 of the shank, in which it preferably fits loosely. This key is made longer than the diameter of the shank, and its opposite ends are disposed or seated in slots or sockets 21 formed in the outer face of the head 11. Cap 18 is then placed in position to cover and hold the key in its operative position. By this means, the force or power employed to drive shank 2 is communicated to the key, and the ends of the key then drive the cutting parts and the floating follower. The driving of the cutting-head and follower by the key 20 disposed in the outer end of the spindle, constitutes one of the principal features of my invention, and it is by reason of the peculiar construction and arrangement of these parts, that my device is capable of readily finding and following the true axis of the machine and of reaming a hole in perfect agreement therewith.

A lathe or boring machine may be off centers, to the extent of a quarter of an inch or more, and still my reamer will accommodate itself to, and ream a hole as perfectly and truly as if the machine was exactly centered and true. The driving of the cutting parts is accomplished solely by means of the key 20 and the cap 18, which are positioned so that the driving power is applied directly to the initial cutting point of the reamer, and owing to the arrangement and function of the gland nut 10, which controls the loosely fitting rear end of the follower, the latter may be adjusted so that it will follow the head 11, and guide or steer the same, in a manner to effect the reaming of a hole in line with the true axis of the machine.

In operating my reamer, soon as the blades 16 begin to cut, the operator may readily observe whether the reamer is binding in the hole or not, and if it is, he may then unscrew the gland-nut 10 until the floating parts become free. The follower and cutters will immediately respond to the relaxing of the tension of the gland-nut, and its rear end will float or vibrate on the portion of the spindle between the slotted end and the threaded part 4. The loosening of the gland-nut will allow the follower to assume a position eccentric to the axis of the spindle, to whatever degree may be necessary to compensate for the discrepancy in the centering of the machine.

Figs. 9, 10, 11 and 12 illustrate a slightly modified form of reamer, being a construction which is preferably varied from that shown in the preceding figures, in order to adapt my improvement to reamers having diameters less than two and one-half inches.
For all the smaller sizes of reamers the shank 2 is substantially the same as for the larger sizes, but the floating part 22 is preferably made of tool-steel and combines both the follower and cutting-head shown for the larger size of reamers, and the cutting portions or blades 23 are formed integrally on the cylinder 22 by milling or otherwise. The follower or cylinder 22 is counter-bored to a greater diameter than the spindle throughout most of its length, so as to allow it a slight play on the spindle. The bore at the cutting end of this cylinder, for a short distance, is contracted to fit the end of the spindle, while the rear end of the follower is formed into a cone 9, and a gland-nut 10 is provided for the same purpose as described for the larger sizes. Owing to the smaller diameter of the cylinder 22, the diameter of the circular connecting-cap 18 is necessarily reduced to such an extent that it cannot be secured directly to the end of the cylinder, so as to connect the latter to the outer end of the spindle. The cap 18, therefore, is only connected to the outer end of the spindle by means of screws 24. Under the construction and arrangement of the parts, as shown in Fig. 9, the cylinder 22 when mounted in working position is not positively connected to anything, but is simply confined between the cap 18 and a shoulder 25, which engages the cone portion 9. By this means the cylinder is held from longitudinal movement, but is allowed a slight floating or vibrating movement at its rear end only, by reason of its enlarged bore, when the gland-nut is loosened. The driving of the follower or cylindrical cutter of the modified form of reamer, is effected solely by the key 20, which is constructed the same as described for the larger sizes, but is intended to be fitted or driven tightly in the slot 5 formed in the end of the spindle 2. The key having a greater length than the diameter of the spindle, its projecting ends are embedded tightly in the notches or slots 21, which are formed in the front end of cylinder 22 on opposite sides of the bore. In assembling the parts of the reamer the gland-nut is first applied to the threaded portion of the spindle, the follower is next placed in position, then the key is driven into the slots 5 and 21, after which the cap 18 is applied and secured by the screws 23. The end of the spindle, as shown in Fig. 9, is slightly convexed so as to allow the rear end of the reamer to accommodate itself to, or find the true axis of the machine. The principles and functions of the several parts of the reamers, as shown herein, are substantially the same. The variation in the construction being necessary in order to adapt the invention to both large and small reamers.

Fig. 9 is intended to illustrate what is commonly known as a "rose" reamer having cutters only at the front end. This could be readily changed or made into a "shell" or "fluted" reamer, by omitting the peculiar shaped end-cutters, and substituting integral cutting-blades or parts running the full length of the follower as indicated by the dotted lines 26 in Fig. 9.

It is possible with my improved reamer, to ream out a hole, in which but a single rough cut has been made with a boring-tool. On the larger and more heavily constructed reamers, the cutting-blades may readily make a cut one-eighth of an inch in depth, thus making a hole perfect and performing the entire operation by an amount of work equal to but two boring chips. Only the cutter-blades, as 16, need to be renewed, and rough, "high-speed" steel, may be driven into the grooves of head 11, and ground off to provide a set of new cutters. When operating my reamer between centers of a lathe, it is not necessary to hold the reamer back, as must be done when using many of the old style of reamers, because the cutting is principally done by the blades 16, and little if any work being done by the follower blades, the reamer will not draw inwardly by reason of any cramping effect. Many of the old reamers have to be held back on the centers to prevent them from running off center, as well as to prevent the cutters from digging into the solid metal and either stalling or breaking the reamer. The reamer of the present invention being driven from the initial cutting end needs no hold-back, and will not fail to ream a hole true to the axis of the machine if the operator will make use of the gland-nut at the proper time and in the proper way.

It is obvious that some modifications or changes may be made in the parts within the scope defined by the appended claims, and I therefore do not restrict myself to the precise construction and arrangement, as herein shown and described.

Having thus described my invention what I claim as new and desire to secure by Letters Patent, is—

1. In a reamer, the combination with a spindle having a handle at one end, and a slot formed diametrically in the other end, of a cylindrical-shell mounted on said spindle and having cutting blades, the outer end of said shell bored out centrally to closely fit the end of said spindle, the inner end counter-bored to loosely fit said spindle, oppositely facing sockets formed in the outer end of said shell in line with the slot in the end of said spindle, a key loosely fitting said slot, and also engaging said sockets, for the purpose of driving said shell in equal time with said spindle, and a cap rigidly connected to the outer end of said shell and yieldingly connected to the outer end of said spindle adapted to hold said key from disengagement with said slot and said sockets.

2. In a reamer, the combination with a spindle having a diametric slot, of a cylindrical cutter-shell loosely mounted upon said spindle, a key fitted in the slot in said spindle and movable therewith adapted to drive said cutter-shell, and a cap rigidly attached to the outer end of the cutter-shell and connected with the spindle.

3. A reamer of the class described, comprising a spindle provided with a diametric slot, a cutter-head mounted on said spindle, the outer end of the cutter-head being provided with sockets coinciding with the slot in said spindle, a key disposed in said slot and said sockets adapted to coöperate with said spindle for driving said cutter-head, a cap mounted upon the outer end of said spindle and over-lapping and unyieldingly connected to said cutter-head, and a series of cutting blades projecting radially from the circumferential surface of said cutter-head.

4. In a reamer of the class described, the combination with a spindle, of a cylinder mounted upon said spindle, comprising a cutter-head and a follower rigidly joined together to form one operative part, a slot formed across the outer end of the spindle, sockets formed in the face of the outer end of said cylinder in line with said slot, a key loosely fitting in the slot in the spindle, its opposite ends projecting into the sockets in said cylinder, adapted when driven by power applied to said spindle to drive said cylinder, and other means for connecting the outer end of the cylinder to the outer end of said spindle, and connecting the parts of the cylinder together.

5. A reamer, comprising a shank adapted to be operated by a lathe, a cylindrical cutter-head mounted upon said shank, the said cutter-head having a central bore corresponding to the diameter of the shank for a portion of its length, and bored out to a diameter greater than the shank the remainder of its length, a circular cap yieldingly connected to the outer end of the shank, and rigidly connected to the cutter-head, means for driving the cutter-head when said shank is operated by the power of the lathe, a series of cutting-blades disposed radially in the circumferential surface of the cutter-head, and means carried by said spindle adapted to permit the floating of said cutter-head for the purpose of reaming a hole true to the axis of the lathe, whether or not the latter is truly centered.

6. A reamer, comprising a spindle having its free end formed convex, and having a threaded portion near the opposite end, a cap loosely mounted on the convex end of the spindle adapted to rock slightly thereon, a member adjustably mounted on said threaded portion, a cylindrical cutter-shell loosely mounted upon said spindle between said member and said cap, the inner end thereof adapted to float or vibrate on said spindle by the loosening of said member, a series of screws for rigidly connecting said cap to said cutter-shell, means adapted to drive the said cutter-shell by exerting the power directly to its outer end.

7. A reamer, comprising a spindle having a slot formed in its outer end, a cutter-shell bored out centrally mounted upon said spindle, a socket formed on each side of the bore in the outer end of the head in line with said slot, a key fitted in said slot and also engaging said sockets adapted to positively drive said cutter-shell, and a series of cutting-blades carried by said head.

8. A reamer, comprising a spindle having a threaded portion near one end and a diametric slot in its opposite end, a cutter-shell loosely mounted upon said spindle having oppositely facing slots in its outer end, its inner end having a rearwardly projecting cone-shaped portion, a gland-nut fitting the threaded portion of said spindle adapted to hold the said cutter-shell rigidly concentric with said spindle and also to allow said cutter-shell to float to a position eccentric to said spindle, cutter-blades carried by said cutter-shell, and a key disposed in said slot and in said sockets adapted to drive said cutter-shell.

9. A reamer of the class described comprising a spindle for connection with a boring machine, a cutter-shell mounted on said spindle so that one end thereof is permanently concentric with respect to the spindle while the other end is adapted to float thereon, and means operable to hold the free or floating end of the shell rigid with respect to the spindle.

10. A reamer of the class described comprising a spindle for connection with a boring machine, a cutter-shell mounted on said spindle so that one end thereof is permanently concentric with respect to the spindle while the other end is adapted to float thereon, and means engageable with the floating end of the shell to hold the same rigid and concentric with respect to the spindle or permit floating movement thereof.

11. A reamer of the class described comprising a spindle for connection with a boring machine, a cutter-shell receiving the said spindle and snugly fitting the spindle at one end, the other end of the shell being adapted for floating movement for the purpose described, and a member adjustably mounted on the spindle and arranged to hold the movable end of the shell rigid or permit floating movement thereof whenever desired.

In testimony whereof I affix my signature in presence of two witnesses.

JOHN GALLAGHER.

Witnesses:
JEROME HADCOCK,
HARRY DE WALLACE.